US007606957B2

(12) United States Patent
Furuzono

(10) Patent No.: US 7,606,957 B2
(45) Date of Patent: Oct. 20, 2009

(54) BUS SYSTEM INCLUDING A BUS ARBITER FOR ARBITRATING ACCESS REQUESTS

(75) Inventor: Takanori Furuzono, Osaka (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 11/882,162

(22) Filed: Jul. 31, 2007

(65) Prior Publication Data
US 2008/0034141 A1 Feb. 7, 2008

(30) Foreign Application Priority Data
Aug. 3, 2006 (JP) ............................. 2006-211927

(51) Int. Cl.
*G06F 13/38* (2006.01)
(52) U.S. Cl. .................................................. 710/244
(58) Field of Classification Search ......... 710/111–112, 710/45, 240–244, 260–269, 56–57; 711/133–136
See application file for complete search history.

(56) References Cited

U.S. PATENT DOCUMENTS 6,006,303 A * 12/1999 Barnaby et al. ............. 710/244
6,385,678 B2 * 5/2002 Jacobs et al. ................ 710/113
6,834,329 B2 * 12/2004 Sasaki et al. ................ 711/134
2006/0155904 A1 7/2006 Murakami et al.
2006/0174045 A1 8/2006 Maeda et al.

FOREIGN PATENT DOCUMENTS

WO WO 98/12645 3/1998

* cited by examiner

*Primary Examiner*—Raymond N Phan
(74) *Attorney, Agent, or Firm*—McDermott Will & Emery LLP

(57) ABSTRACT

A bus system is provided, which includes a shared resource, a shared bus, a plurality of requesters, and a bus arbiter for arbitrating access requests made by the plurality of requesters to access the shared resource through the shared bus. At least one of the plurality of requesters outputs, according to an internal state in that requester, an internal state signal indicating that the priority of an access request made by that requester needs to be changed. The bus arbiter arbitrates the access requests in accordance with the internal state signal.

4 Claims, 9 Drawing Sheets

BUS SYSTEM INCLUDING A BUS ARBITER FOR ARBITRATING ACCESS REQUESTS

CROSS-REFERENCE TO RELATED APPLICATION

This application claims priority under 35 U.S.C. §119 on Patent Application No. 2006-211927 filed in Japan on Aug. 3, 2006, the entire contents of which are hereby incorporated by reference.

BACKGROUND OF THE INVENTION

The present invention relates to a system which performs bus arbitration for access made by a plurality of requesters to a shared resource through a shared bus.

Recently, in a system LSI, it has become important to enable requesters, such as a CPU and a media processing engine, to access a shared resource, such as memory, as many times as required by the system. Where requesters make access to the shared resource, an arbiter which performs arbitration to avoid conflicts is necessary.

The pamphlet of International Publication WO98/12645, for example, discloses a method and apparatus for bus arbitration, in which each requester is permitted to make access a set number of times corresponding to a weight allocated to that requester, thereby enabling performance required by the system to be achieved.

In the conventional bus arbiter, however, a high priority is likely to be assigned to a requester which transfers large amounts of data, such as moving images. That is, in a system LSI, etc., used in the field of multimedia, a CPU is often assigned a lower priority than a media processing engine and the like. Thus, a latency time, occurring when the CPU accesses memory and including a time during which the CPU waits for completion of other requesters' accesses, increases. This results in the problem of decreased real time performance of the system.

SUMMARY OF THE INVENTION

It is therefore an object of the present invention to enhance the performance of a system by reducing access latency occurring in a requester, such as a CPU, in the system, which is assigned low priority and which accesses a shared resource with frequency that depends on the internal state thereof.

Specifically, an inventive bus system includes: a shared resource; a shared bus; a plurality of requesters; and a bus arbiter for arbitrating access requests made by the plurality of requesters to access the shared resource through the shared bus, wherein at least one of the plurality of requesters outputs, according to an internal state in that requester, an internal state signal indicating that the priority of an access request made by that requester needs to be changed; and the bus arbiter arbitrates the access requests in accordance with the internal state signal.

Then, the bus arbiter changes the priority of the access request in accordance with the signal from the requester, such that the internal state of the requester can be reflected in the access request arbitration.

In the bus system, the bus arbiter preferably selects one of predetermined priority orders for the plurality of requesters in accordance with the internal state signal and grants access according to the selected priority order.

Then, the bus arbiter selects a priority order for the requesters in accordance with the signal from the requester. It is thus easy for the bus arbiter to determine the priority order.

In the bus system, the priority orders preferably include a first priority order and a second priority order; in the first priority order, a priority according to which the requester that outputs the internal state signal is granted access is preferably higher than that in the second priority order; and if the internal state signal indicates that the priority needs to be raised, the bus arbiter preferably selects the first priority order, and otherwise the bus arbiter preferably selects the second priority order.

Then, when the bus arbiter receives from a requester a signal indicating that the priority of an access request from that requester should be raised, the bus arbiter selects a priority order in which that requester has high priority. Thus, when a requester particularly needs to make access, the bus arbiter can arbitrate in such a manner that that requester is prioritized.

In the bus system, the priority orders preferably further include a third priority order; in the third priority order, the priority according to which the requester that outputs the internal state signal is granted access is preferably lower than that in the second priority order; and if the internal state signal indicates that the priority needs to be lowered, the bus arbiter preferably selects the third priority order.

Then, when the bus arbiter receives from a requester a signal indicating that the priority of an access request from that requester should be lowered, the bus arbiter selects a priority order in which that requester has low priority. Thus, when a requester does not have much need to make access, the bus arbiter can arbitrate in such a manner that the other requesters are prioritized.

In the bus system, the bus arbiter preferably stores in a queue the access requests from the plurality of requesters in order of receipt, determines, according to the internal state signal, an order for the access requests stored in the queue, and grants the plurality of requesters access in accordance with the determined order.

In the bus system, if the internal state signal indicates that the priority needs to be raised, the bus arbiter preferably changes the order for the access requests stored in the queue in such a manner that the access request made by the requester that outputs the internal state signal has higher priority than the others.

Then, when the bus arbiter receives from a requester a signal indicating that the priority of an access request from that requester should be raised, the bus arbiter prioritizes that access request in the queue. Thus, when a requester particularly needs to make access, the bus arbiter can arbitrate in such a manner that that requester is prioritized.

In the bus system, the bus arbiter preferably determines, according to the internal state signal, one or more of the plurality of requesters whose access requests will be accepted by the bus arbiter.

Then, according to a signal from a requester, the bus arbiter determines a requester or requesters from which access requests will be accepted. It is thus possible to reduce the number of requesters for which arbitration is performed.

In the bus system, if the internal state signal indicates that the priority needs to be raised, the bus arbiter preferably accepts the access request made by the requester that outputs the internal state signal.

Then, when the bus arbiter receives from a requester a signal indicating that the priority of an access request from that requester should be raised, the bus arbiter accepts the access request from that requester. Thus, when a requester particularly needs to make access, the bus arbiter can arbitrate in such a manner that that requester is prioritized.

In the bus system, at least one of the at least one requester that outputs the internal state signal preferably has a cache memory and generates the internal state signal of that requester in accordance with the cache hit rate of the cache memory.

Then, the hit rate of the cache memory in the requester that requests to make access can be reflected in the access request arbitration.

In the bus system, if the cache hit rate is lower than a predetermined value, the requester having the cache memory preferably makes the internal state signal indicate that the priority of an access request made by that requester needs to be raised.

Then, when the hit rate of the cache memory in the requester that requests to make access is low, the bus arbiter can arbitrate in such a manner that that requester is prioritized.

In the bus system, if the cache hit rate is lower than a first reference value, the requester having the cache memory preferably makes the internal state signal indicate that the priority needs to be raised; if the cache hit rate is equal to or higher than the first reference value and equal to or lower than a second reference value, the requester having the cache memory preferably makes the internal state signal indicate that the priority needs to be maintained; and if the cache hit rate is higher than the second reference value, the requester having the cache memory preferably makes the internal state signal indicate that the priority needs to be lowered.

Then, the bus arbiter can perform the access request arbitration according to the hit rate of the cache memory in the requester that requests to make access.

In the bus system, if a second cache hit rate, measured after an already measured first cache hit rate, is lower than a value, which is lower than the first cache hit rate by a predetermined value, the requester having the cache memory preferably makes the internal state signal indicate that the priority needs to be raised.

Then, when the hit rate of the cache memory in the requester that requests to make access is lower than a value, which is lower than the first cache hit rate by a predetermined value, the bus arbiter can arbitrate in such a manner that that requester is prioritized.

In the bus system, if a second cache hit rate, measured after an already measured first cache hit rate, is lower than a first value, which is lower than the first cache hit rate by a predetermined value, the requester having the cache memory preferably makes the internal state signal indicate that the priority needs to be raised; if the second cache hit rate is equal to or higher than the first value and equal to or lower than a second value, which is higher than the first cache hit rate by a predetermined value, the requester having the cache memory preferably makes the internal state signal indicate that the priority needs to be maintained; and if the second cache hit rate is higher than the second value, the requester having the cache memory preferably makes the internal state signal indicate that the priority needs to be lowered.

Then, the bus arbiter can perform the access request arbitration in accordance with variation in the hit rate of the cache memory in the requester that requests to make access.

In the bus system, at least one of the at least one requester that outputs the internal state signal preferably has an interrupt control section for controlling an interrupt occurring in that requester and generates the internal state signal of that requester in accordance with notification of occurrence of an interrupt from the interrupt control section.

Then, the interrupt occurring in the requester that requests to make access can be reflected in the access request arbitration.

In the bus system, the requester having the interrupt control section preferably makes the internal state signal indicate that the priority needs to be raised during a predetermined amount of time after the occurrence of the interrupt, and indicate that the priority needs to be maintained after the predetermined amount of time has elapsed.

Then, in the case of the occurrence of the interrupt in the requester that requests to make access, the bus arbiter can arbitrate in such a manner that the requester is prioritized during a specific period of time.

In the bus system, the shared resource preferably inputs and outputs data to and from the shared bus in accordance with access granted as a result of the access request arbitration.

Then, data can be input and output from the shared resource for the access granted as a result of the arbitration.

According to the present invention, even a requester that was beforehand assigned a low priority can have the internal state thereof reflected in access request arbitration so that the priority thereof is raised. Thus, access latency in that requester is reduced, allowing the real time performance of the system to be increased.

DETAILED DESCRIPTION OF THE INVENTION

Hereinafter, embodiments of the present invention will be described with reference to the accompanying drawings.

First Embodiment

Figure 1:
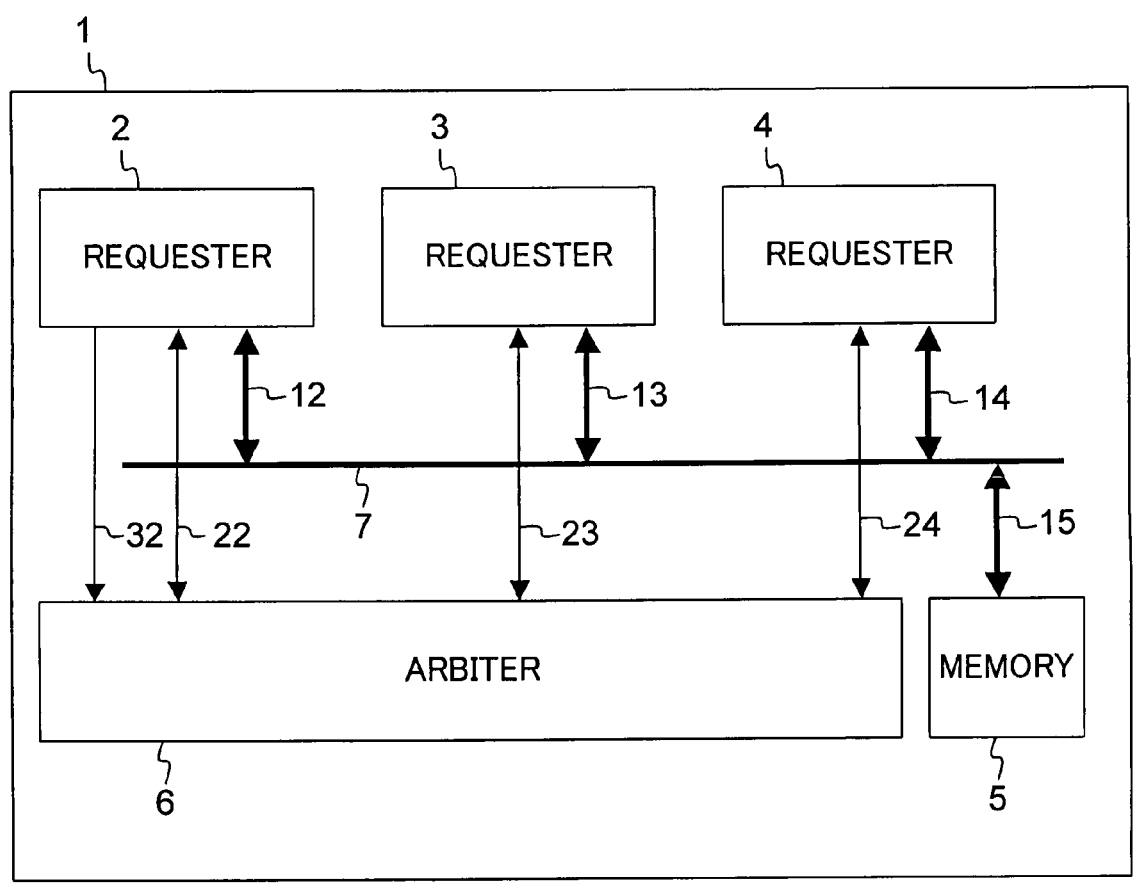
FIG. 1 is a block diagram illustrating the configuration of a bus system according to an embodiment of the present invention.

FIG. 1 is a block diagram illustrating the configuration of a bus system 1 according to the present invention. The bus system 1 shown in FIG. 1 includes requesters 2, 3, and 4, a memory 5 as a shared resource, a bus arbiter (hereinafter referred to as an "arbiter") 6, and a shared bus 7. Shared resources other than the memory may also be included.

The requesters 2, 3, and 4 input and output shared bus interface signals 12, 13, and 14, respectively, as interfaces to the shared bus 7. Likewise, the memory 5 inputs and outputs a shared bus interface signal 15 as an interface to the shared bus 7. These signals allow the requesters 2, 3, and 4 to access the memory 5 through the shared bus 7.

The arbiter 6 inputs and outputs arbitration interface signals 22, 23, and 24 as interfaces to the requesters 2, 3, and 4, respectively, and arbitrates access requests made by the requesters 2, 3, and 4 to access the memory 5 via the shared bus 7.

The arbiter 6 has a plurality of priority orders used in arbitration performed when access requests from the requesters 2, 3, and 4 conflict each other. In this embodiment, the arbiter 6 has the following three priority orders, for example: in a priority order 1, the priorities of the requesters 2, 3, and 4 decrease in that order; in a priority order 2, the priorities of the requesters 4, 2, and 3 decrease in that order; and in a priority order 3, the priorities of the requesters 3, 4, and 2 decrease in that order.

Which priority order is used in which time period is determined in advance so that the number of data transmissions required by each requester can be satisfied in the system. Which priority order is used in which time period does not have to be set fixed, but may be changeable by register settings or by programs. Furthermore, the length of time period during which a single priority order is employed may be set changeable by register settings or by programs.

The requester 2 outputs an internal state signal 32 to the arbiter 6 so that the internal state in the requester 2 is reflected in arbitration. The internal state signal 32 indicates one of the three states: the first state indicating that the priority of the access request of the requester 2 should be raised; the second state indicating that the normal priority should be maintained; and the third state indicating that the priority should be lowered.

Figure 2:
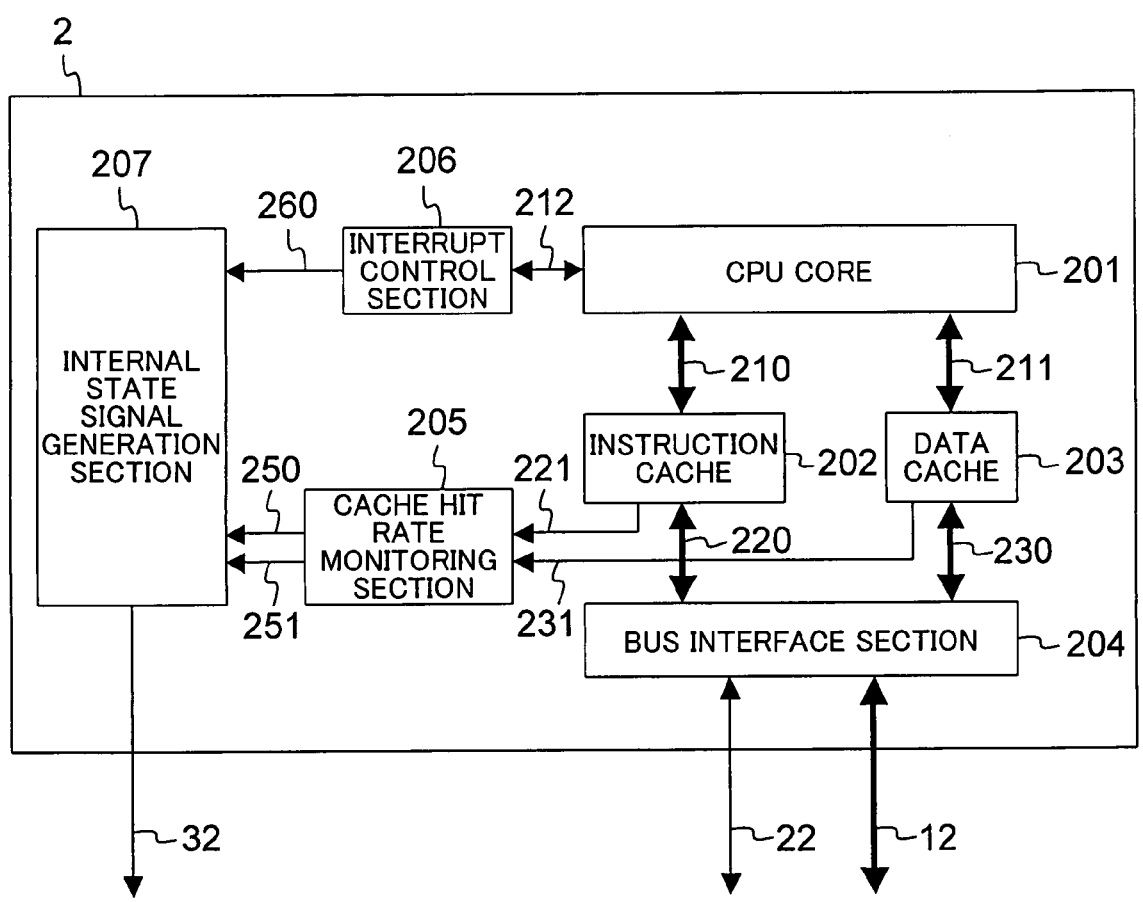
FIG. 2 is a block diagram illustrating the configuration of a requester 2 shown in FIG. 1.

FIG. 2 is a block diagram illustrating the configuration of the requester 2 shown in FIG. 1. The requester 2 shown in FIG. 2 includes a CPU core 201, an instruction cache 202, a data cache 203, a bus interface section 204, a cache hit rate monitoring section 205, an interrupt control section 206, and an internal state signal generation section 207. The instruction cache 202 and the data cache 203 each include a cache memory having a necessary capacity.

The CPU core 201 executes an instruction provided from the memory 5 shown in FIG. 1. The CPU core 201 inputs and outputs CPU core interface signals 210 and 211 as interfaces to the instruction cache 202 and the data cache 203, respectively.

The instruction cache 202 retains therein a copy of an instruction stored in the memory 5, the data cache 203 retains therein a copy of data stored in the memory 5, and the instruction cache 202 and the data cache 203 each retain therein data written from the CPU core 201. The instruction cache 202 and the data cache 203 output a cache access information signal 221 and a cache access information signal 231, respectively, to the cache hit rate monitoring section 205. The instruction cache 202 and the data cache 203 also input and output cache interface signals 220 and 230, respectively, as interfaces to the bus interface section 204.

The bus interface section 204 accesses the memory 5 through the shared bus 7 shown in FIG. 1. The bus interface section 204 inputs and outputs the shared bus interface signal 12 as an interface to the shared bus 7, and inputs and outputs the arbitration interface signal 22 as an interface to the arbiter 6.

Based on the cache access information signals 221 and 231, the cache hit rate monitoring section 205 calculates the respective cache hit rates of the instruction cache 202 and data cache 203 for a specified period of time. The cache hit rate monitoring section 205 notifies the internal state signal generation section 207 of the hit rates of the instruction cache 202 and data cache 203 by outputting respective cache hit rate information signals 250 and 251 to the internal state signal generation section 207. The time period for which the hit rates are calculated may be changeable by register settings or by programs.

The interrupt control section 206 controls an interrupt occurring in or to the requester 2. The interrupt control section 206 inputs and outputs an interrupt interface signal 212 as an interface to the CPU core 201. The interrupt control section 206 also outputs an interrupt notification signal 260 to the internal state signal generation section 207 during a certain period of time to notify the internal state signal generation section 207 of the occurrence of an interrupt. The interrupt control section 206 do not need to notify the internal state signal generation section 207 of all interrupts by outputting the interrupt notification signal 260. Depending on the type of interrupt, register settings, or programs, some interrupts may be disabled, and notification of such interrupts does not have to be made. The period of time, during which notification is given, may be changeable by register settings or by programs.

The internal state signal generation section 207 generates the internal state signal 32 based on the cache hit rate information signals 250 and 251 and on the interrupt notification signal 260 and outputs the generated internal state signal 32 to the arbiter 6.

Figure 3:
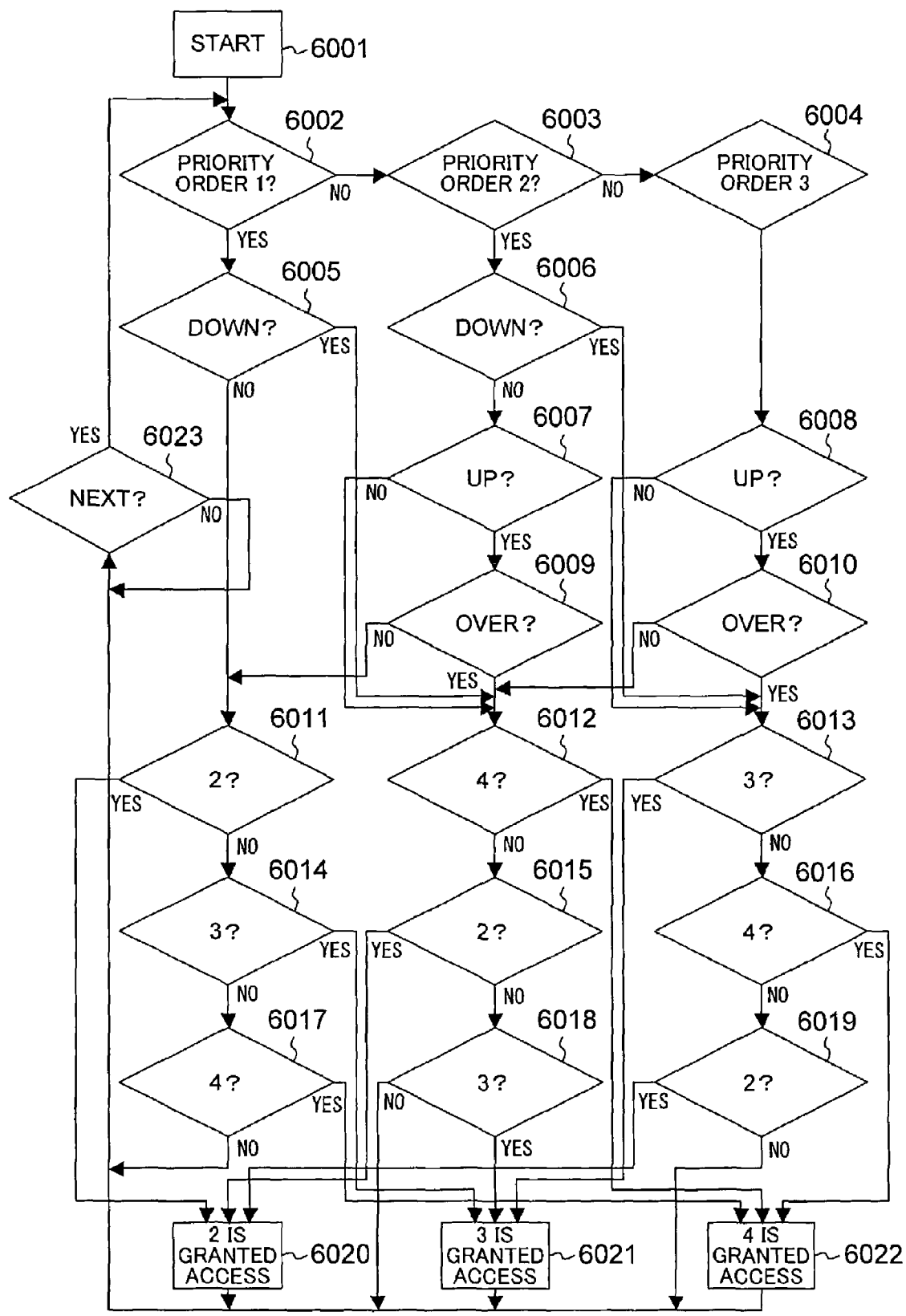
FIG. 3 is a flowchart showing the flow of arbitration process performed by an arbiter according to the first embodiment of the present invention.

FIG. 3 is a flowchart showing the flow of arbitration process performed by the arbiter 6 shown in FIG. 1 according to the first embodiment of the present invention.

The initial state is Step 6001, and after the system has been started, the process goes to Step 6002.

In Step 6002, it is determined whether or not the priority order used in the arbitration by the arbiter 6 is the priority order 1. If the priority order used in the arbitration is the priority order 1, the process goes to Step 6005, and if not, the process goes to Step 6003.

In Step 6003, it is determined whether or not the priority order used in the arbitration is the priority order 2. If the priority order used in the arbitration is the priority order 2, the process goes to Step 6006, and if not, the process goes to Step 6004.

In Step 6004, it is automatically determined that the priority order used in the arbitration is the priority order 3, and the process goes to Step 6008.

In Step 6005, it is determined whether the internal state signal 32 indicates the third state indicating that the priority should be lowered. If so, the process goes to Step 6012 so as to change the priority order used in the arbitration, and if not, the process goes to Step 6011.

In Step 6006, it is determined whether the internal state signal 32 indicates the third state indicating that the priority should be lowered. If so, the process goes to Step 6013 so as to change the priority order used in the arbitration, and if not, the process goes to Step 6007.

In Step 6007, it is determined whether the internal state signal 32 indicates the first state indicating that the priority should be raised. If so, the process goes to Step 6009, and if not, the process goes to Step 6012.

In Step 6008, it is determined whether the internal state signal 32 indicates the first state indicating that the priority should be raised. If so, the process goes to Step 6010, and if not, the process goes to Step 6013.

In Step 6009, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6012 without raising the priority of the requester 2 in this time period. If not, the process goes to Step 6011 so as to change the priority order used in the arbitration. It should be noted that this time period and the reference value do not have to be set fixed, but may be changeable by register settings or by programs.

Likewise, in Step 6010, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6013 without raising the priority of the requester 2 in this time period. If not, the process goes to Step 6012 so as to change the priority order used in the arbitration.

In Step 6011, it is determined whether there is a request made from the requester 2 that is the highest priority requester in the priority order 1. If there is a request from the requester 2, the process goes to Step 6020, and if not, the process goes to Step 6014.

In Step 6012, it is determined whether there is a request made from the requester 4 that is the highest priority requester in the priority order 2. If there is a request from the requester 4, the process goes to Step 6022, and if not, the process goes to Step 6015.

In Step 6013, it is determined whether there is a request made from the requester 3 that is the highest priority requester in the priority order 3. If there is a request from the requester 3, the process goes to Step 6021, and if not, the process goes to Step 6016.

In Step 6014, it is determined whether there is a request made from the requester 3 that is the second-highest priority requester in the priority order 1. If there is a request from the requester 3, the process goes to Step 6021, and if not, the process goes to Step 6017.

In Step 6015, it is determined whether there is a request made from the requester 2 that is the second-highest priority requester in the priority order 2. If there is a request from the requester 2, the process goes to Step 6020, and if not, the process goes to Step 6018.

In Step 6016, it is determined whether there is a request made from the requester 4 that is the second-highest priority requester in the priority order 3. If there is a request from the requester 4, the process goes to Step 6022, and if not, the process goes to Step 6019.

In Step 6017, it is determined whether there is a request made from the requester 4 that is the third-highest priority requester in the priority order 1. If there is a request from the requester 4, the process goes to Step 6022, and if not, the process goes to Step 6023.

In Step 6018, it is determined whether there is a request made from the requester 3 that is the third-highest priority requester in the priority order 2. If there is a request from the requester 3, the process goes to Step 6021, and if not, the process goes to Step 6023.

In Step 6019, it is determined whether there is a request made from the requester 2 that is the third-highest priority requester in the priority order 3. If there is a request from the requester 2, the process goes to Step 6020, and if not, the process goes to Step 6023.

In Step 6020, the request from the requester 2 is permitted such that the requester 2 accesses the memory 5. After the completion of the access, the process goes to Step 6023.

In Step 6021, the request from the requester 3 is permitted such that the requester 3 accesses the memory 5. After the completion of the access, the process goes to Step 6023.

In Step 6022, the request from the requester 4 is permitted such that the requester 4 accesses the memory 5. After the completion of the access, the process goes to Step 6023.

In Step 6023, the process waits until the next access can be permitted, and when it becomes possible to permit the access, the process goes to Step 6002.

Figure 4:
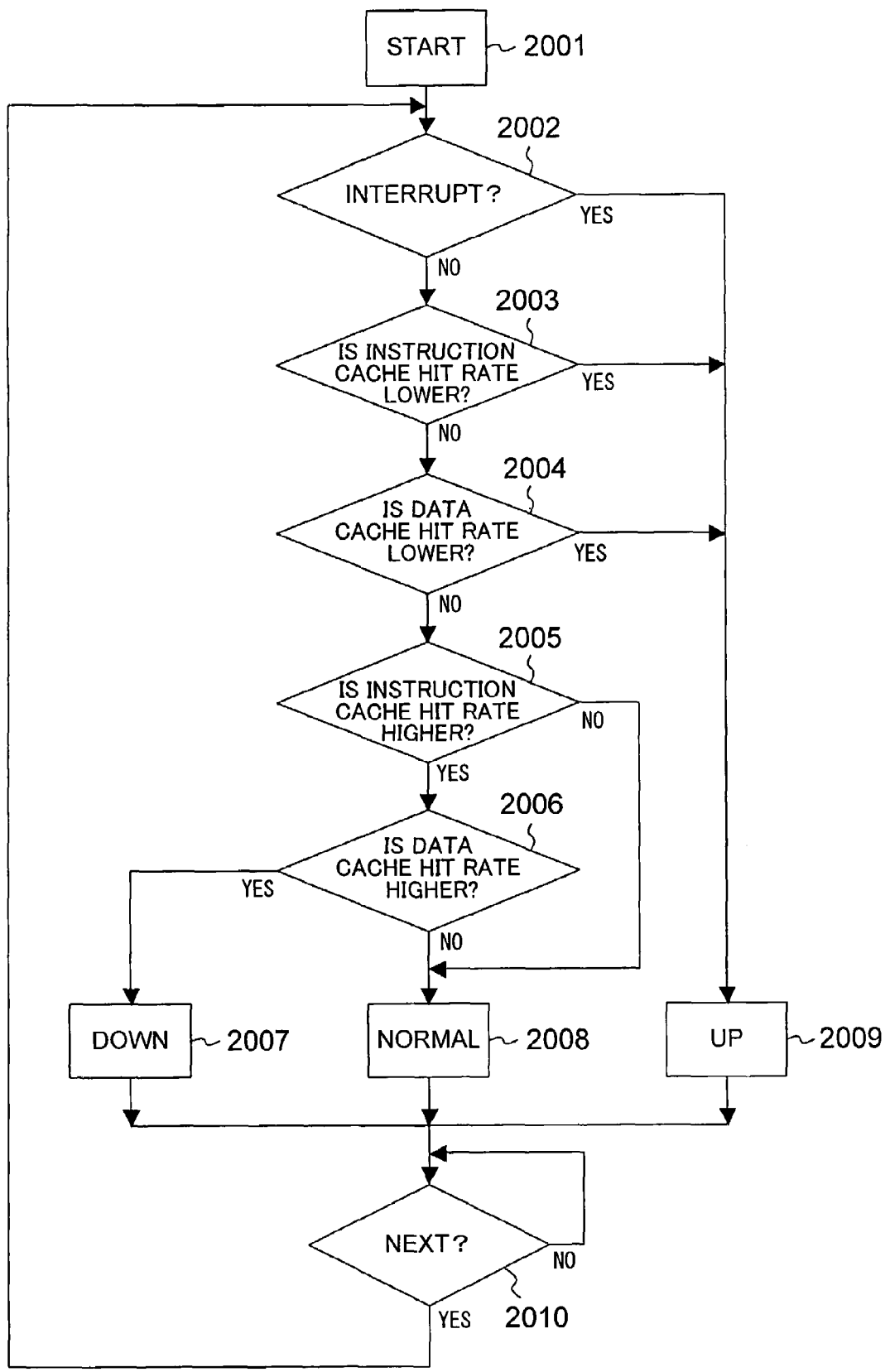
FIG. 4 is a flowchart showing the flow of process for generating an internal state signal in an internal state signal generation section according to the first embodiment of the present invention.

FIG. 4 is a flowchart showing the flow of process for generating the internal state signal 32 in the internal state signal generation section 207 shown in FIG. 2 according to the first embodiment of the present invention.

The initial state is Step 2001, and after the system has been started, the process goes to Step 2002.

In Step 2002, a determination is made as to whether or not notification about occurrence of an interrupt has been made by the interrupt notification signal 260. If the notification has been made, the process goes to Step 2009, and if not, the process goes to Step 2003.

In Step 2003, a determination is made as to whether or not the hit rate of the instruction cache, notification of which is made by the cache hit rate information signal 250, is lower than a first reference value predetermined for the instruction cache. If the hit rate is lower than the first predetermined reference value, the process goes to Step 2009, and if not, the process goes to Step 2004.

In Step 2004, a determination is made as to whether or not the hit rate of the data cache, notification of which is made by the cache hit rate information signal 251, is lower than a first reference value predetermined for the data cache. If the hit rate is lower than the first predetermined reference value, the process goes to Step 2009, and if not, the process goes to Step 2005.

It should be noted that the first reference values for the instruction cache and data cache do not need to be set fixed, but may be changeable by register settings or by programs. Also, the first reference values for the instruction cache and data cache do not have to be the same value.

In Step 2005, a determination is made as to whether or not the hit rate of the instruction cache, notification of which is made by the cache hit rate information signal 250, is higher than a second reference value predetermined for the instruction cache. If the hit rate is higher than the second predetermined reference value, the process goes to Step 2006, and if not, the process goes to Step 2008. The second reference value for the instruction cache is higher than the first reference value for the instruction cache.

In Step 2006, a determination is made as to whether or not the hit rate of the data cache, notification of which is made by the cache hit rate information signal 251, is higher than a second reference value predetermined for the data cache. If the hit rate is higher than the second predetermined reference value, the process goes to Step 2007, and if not, the process goes to Step 2008. The second reference value for the data cache is higher than the first reference value for the data cache.

It should be noted that the second reference values for the instruction cache and data cache do not need to be set fixed, but may be changeable by register settings or by programs. Also, the second reference values for the instruction cache and data cache do not have to be the same value.

In Step 2007, the internal state signal 32 is made to indicate the third state indicating that the priority should be lowered. After the completion of the processing, the process goes to Step 2010.

In Step 2008, the internal state signal 32 is made to indicate the second state indicating that the normal priority should be maintained. After the completion of the processing, the process goes to Step 2010.

In Step 2009, the internal state signal 32 is made to indicate the first state indicating that the priority should be raised. After the completion of the processing, the process goes to Step 2010.

In Step 2010, the process waits for the next cycle to start, and when the next cycle starts, the process goes to Step 2002.

In this embodiment, a case in which three requesters are provided has been described by way of example. However, the number of requesters, and specific priorities in arbitration do not have to be the same as those described in the example.

Also, the bus system 1 according to this embodiment may be implemented on a single system LSI or on a combination of LSIs.

Furthermore, the internal state signal generation section 207 may make the internal state signal 32 indicate the first state during a predetermined amount of time after occurrence of an interrupt, and indicate the second state after the predetermined amount of time has elapsed.

Second Embodiment

Figure 5:
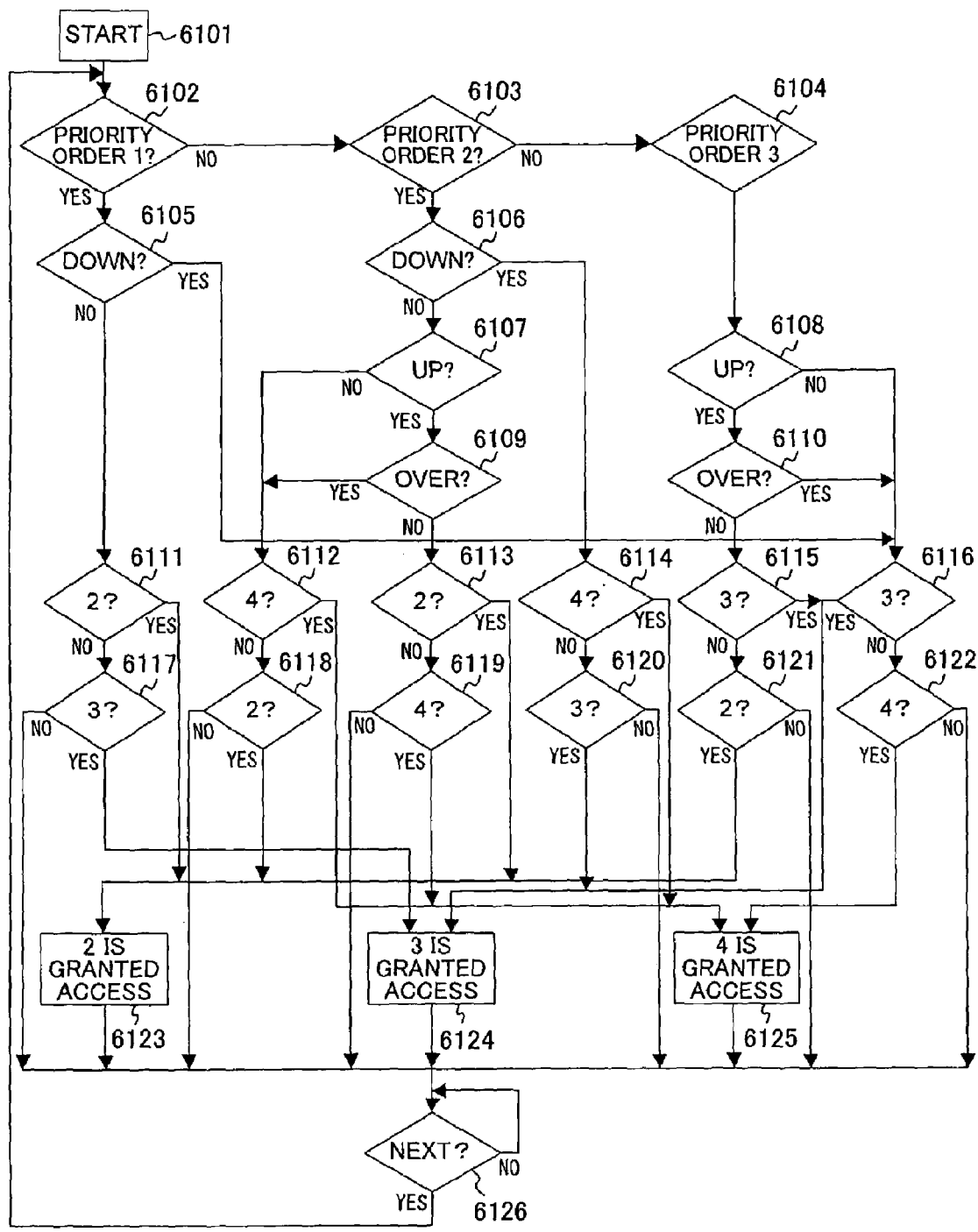
FIG. 5 is a flowchart showing the flow of arbitration process performed in an arbiter according to a second embodiment of the present invention.

FIG. 5 is a flowchart showing the flow of arbitration process performed in the arbiter 6 shown in FIG. 1 according to a second embodiment of the present invention. Arbitration control performed by the arbiter 6 in this embodiment is different from that in the first embodiment.

The arbiter 6 according to this embodiment has the following three priority orders used in arbitration when access requests from the requesters 2, 3, and 4 conflict each other. In a priority order 1, the priories of the requesters 2 and 3 decrease in that order (requests from the requester 4 are not accepted); in a priority order 2, the priorities of the requesters 4 and 2 decrease in that order (requests from the requester 3 are not accepted); and in a priority order 3, the priorities of the requesters 3 and 4 decrease in that order (requests from the requester 2 are not accepted).

The initial state is Step 6101, and after the system has been started, the process goes to Step 6102.

In Step 6102, it is determined whether or not the priority order used in the arbitration by the arbiter 6 of this embodiment is the priority order 1. If the priority order used in the arbitration is the priority order 1, the process goes to Step 6105, and if not, the process goes to Step 6103.

In Step 6103, it is determined whether or not the priority order used in the arbitration is the priority order 2. If the priority order used in the arbitration is the priority order 2, the process goes to Step 6106, and if not, the process goes to Step 6104.

In Step 6104, it is automatically determined that the priority order used in the arbitration is the priority order 3, and the process goes to Step 6108.

In Step 6105, it is determined whether the internal state signal 32 indicates the third state indicating that the priority should be lowered. If so, the process goes to Step 6116 so as to change the priority order used in the arbitration, and if not, the process goes to Step 6111.

In Step 6106, it is determined whether the internal state signal 32 indicates the third state indicating that the priority should be lowered. If so, the process goes to Step 6114 so as to lower the priority of the requester 2, and if not, the process goes to Step 6107.

In Step 6107, it is determined whether the internal state signal 32 indicates the first state indicating that the priority should be raised. If so, the process goes to Step 6109, and if not, the process goes to Step 6112.

In Step 6108, it is determined whether the internal state signal 32 indicates the first state indicating that the priority should be raised. If so, the process goes to Step 6110, and if not, the process goes to Step 6116.

In Step 6109, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6112 without raising the priority of the requester 2 in this time period. If not, the process goes to Step 6113 so as to raise the priority of the requester 2. It should be noted that this time period and the reference value do not have to be set fixed, but may be changeable by register settings or by programs.

Likewise, in Step 6110, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6116 without raising the priority of the requester 2 in this time period. If not, the process goes to Step 6115 so as to raise the priority of the requester 2.

In Step 6111, it is determined whether there is a request made from the requester 2 that is the highest priority requester in the priority order 1. If there is a request from the requester 2, the process goes to Step 6123, and if not, the process goes to Step 6117.

In Step 6112, it is determined whether there is a request made from the requester 4 that is the highest priority requester in the priority order 2. If there is a request from the requester 4, the process goes to Step 6125, and if not, the process goes to Step 6118.

In Step 6113, it is determined whether there is a request made from the requester 2 whose priority has been raised. If there is a request from the requester 2, the process goes to Step 6123, and if not, the process goes to Step 6119.

In Step 6114, it is determined whether there is a request made from the requester 4 that is the highest priority requester in the priority order 2. If there is a request from the requester 4, the process goes to Step 6125, and if not, the process goes to Step 6120.

In Step 6115, it is determined whether there is a request made from the requester 3 that is the highest priority requester in the priority order 3. If there is a request from the requester 3, the process goes to Step 6124, and if not, the process goes to Step 6121.

In Step 6116, it is determined whether there is a request made from the requester 3 that is the highest priority requester in the priority order 3. If there is a request from the requester 3, the process goes to Step 6124, and if not, the process goes to Step 6122.

In Step 6117, it is determined whether there is a request made from the requester 3 that is the second-highest priority requester in the priority order 1. If there is a request from the requester 3, the process goes to Step 6124, and if not, the process goes to Step 6126.

In Step 6118, it is determined whether there is a request made from the requester 2 that is the second-highest priority requester in the priority order 2. If there is a request from the requester 2, the process goes to Step 6123, and if not, the process goes to Step 6126.

In Step 6119, it is determined whether there is a request made from the requester 4 that is the highest priority requester in the priority order 2. If there is a request from the requester 4, the process goes to Step 6125, and if not, the process goes to Step 6126.

In Step 6120, it is determined whether there is a request made from the requester 3 whose access request will be accepted as a result of lowering the priority of the requester 2 in the priority order 2. If there is a request from the requester 3, the process goes to Step 6124, and if not, the process goes to Step 6126.

In Step 6121, it is determined whether there is a request made from the requester 2 whose priority has been raised. If there is a request from the requester 2, the process goes to Step 6123, and if not, the process goes to Step 6126.

In Step 6122, it is determined whether there is a request made from the requester 4 that is the second-highest priority requester in the priority order 3. If there is a request from the requester 4, the process goes to Step 6125, and if not, the process goes to Step 6126.

In Step 6126, the process waits until the next access can be permitted, and when it becomes possible to permit the access, the process goes to Step 6102.

In this embodiment, a case in which three requesters are provided has been described by way of example. However, the number of requesters, and specific priorities in arbitration do not have to be the same as those described in the example.

Third Embodiment

Figure 6:
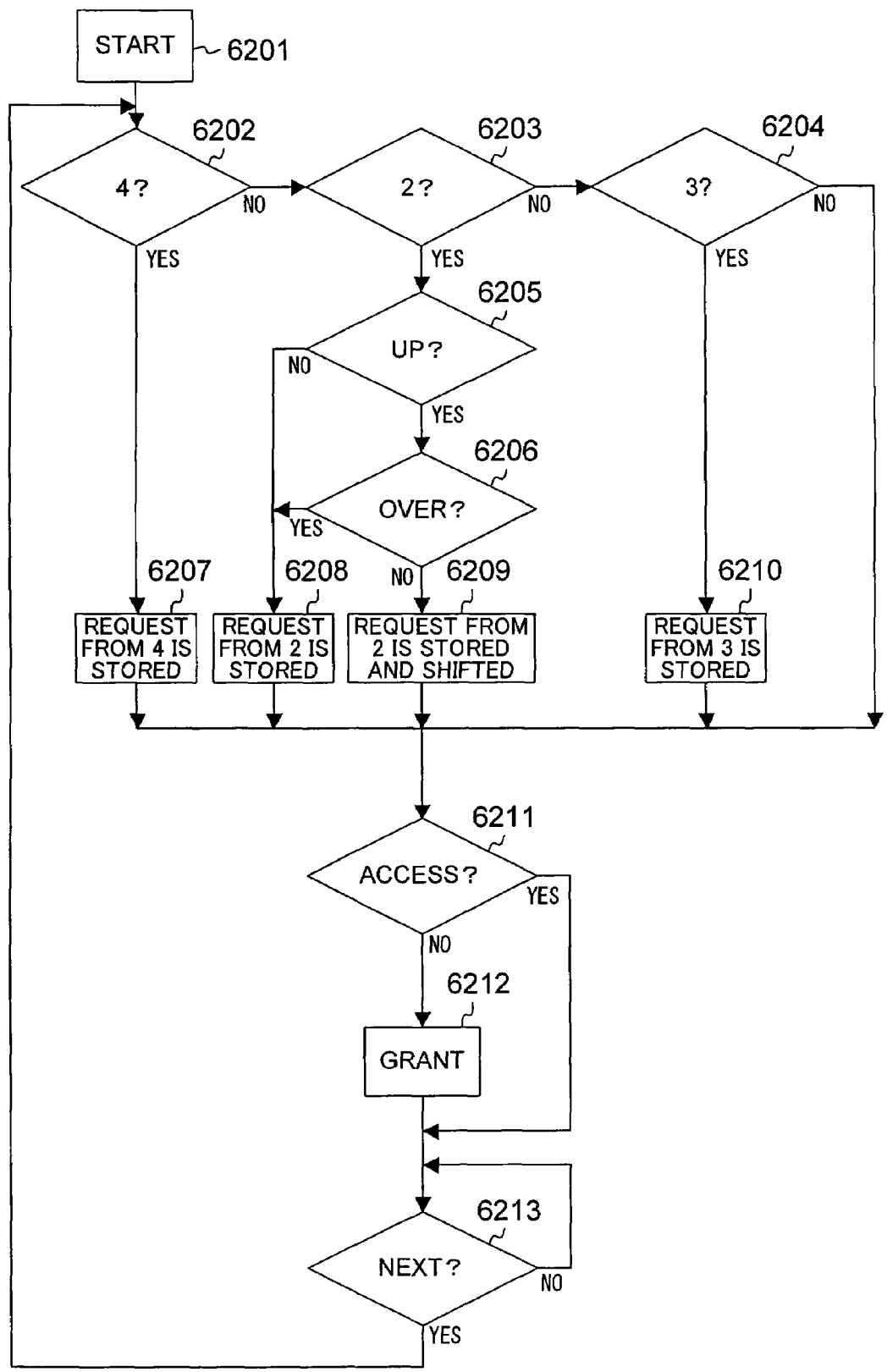
FIG. 6 is a flowchart showing the flow of arbitration process performed in an arbiter according to a third embodiment of the present invention.

FIG. 6 is a flowchart showing the flow of arbitration process performed in the arbiter 6 shown in FIG. 1 according to a third embodiment of the present invention. Arbitration control performed by the arbiter 6 in this embodiment is different from that in the first embodiment.

The arbiter 6 has a queue for storing access requests from requesters, and after a request is made from a requester, the request is stored in this queue. Where access requests made by requesters conflict with each other in the same cycle, arbitration is performed according to a certain priority order, and the requests are sequentially stored in the queue starting from a request determined in the arbitration. The requests stored in the queue are granted basically in the order of storage, and the requesters corresponding to the respective granted requests are sequentially permitted to access the memory 5.

In a priority order that the arbiter 6 of this embodiment has, used in arbitration when access requests from the requesters 2, 3, and 4 conflict each other, the priories of the requesters 4, 2, and 3 decrease in that order.

The initial state is Step 6201, and after the system has been started, the process goes to Step 6202.

In Step 6202, it is determined whether there is a request made from the requester 4 that is the highest priority requester in the priority order that the arbiter 6 of this embodiment has. If there is a request from the requester 4, the process goes to Step 6207, and if not, the process goes to Step 6203.

In Step 6203, it is determined whether there is a request made from the requester 2 that is the second-highest priority requester in the priority order that the arbiter 6 of this embodiment has. If there is a request from the requester 2, the process goes to Step 6205, and if not, the process goes to Step 6204.

In Step 6204, it is determined whether there is a request made from the requester 3 that is the third-highest priority requester in the priority order that the arbiter 6 of this embodiment has. If there is a request from the requester 3, the process goes to Step 6210, and if not, the process goes to Step 6211.

In Step 6205, it is determined whether the internal state signal 32 indicates the first state indicating that the priority should be raised. If so, the process goes to Step 6206, and if not, the process goes to Step 6208.

In Step 6206, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6208. If not, the process goes to Step 6209. It should be noted that this time period and the reference value do not have to be set fixed, but may be changeable by register settings or by programs.

In Step 6207, the request from the requester 4 is stored in the last part of the queue, and the process goes to Step 6211.

In Step 6208, the request from the requester 2 is stored in the last part of the queue, and the process goes to Step 6211.

In Step 6209, the request from the requester 2 is stored in the last part of the queue. Thereafter, all of the requests from the requester 2 stored in the queue are shifted forward by a predetermined shift amount so as to change the order in which the requests stored in the queue are arranged. After the shifting, the process goes to Step 6211. The shift amount does not have to be set fixed, but may be changeable by register settings or by programs.

In Step 6210, the request from the requester 3 is stored in the last part of the queue, and the process goes to Step 6211.

In Step 6211, it is determined whether the memory 5 has been accessed. If the memory 5 has been accessed, the process goes to Step 6213, and if not, the process goes to Step 6212.

In Step 6212, the requester corresponding to the request located at the top of the queue is permitted to access the memory 5. Thereafter, the process goes to Step 6213.

In Step 6213, it is determined whether the next cycle has started. If the next cycle has started, the process goes to Step 6202, and if not, the process waits for the next cycle to start in Step 6213.

In this embodiment, a case in which three requesters are provided has been described by way of example. However, the number of requesters, and specific priorities in arbitration do not have to be the same as those described in the example.

Fourth Embodiment

Figure 7:
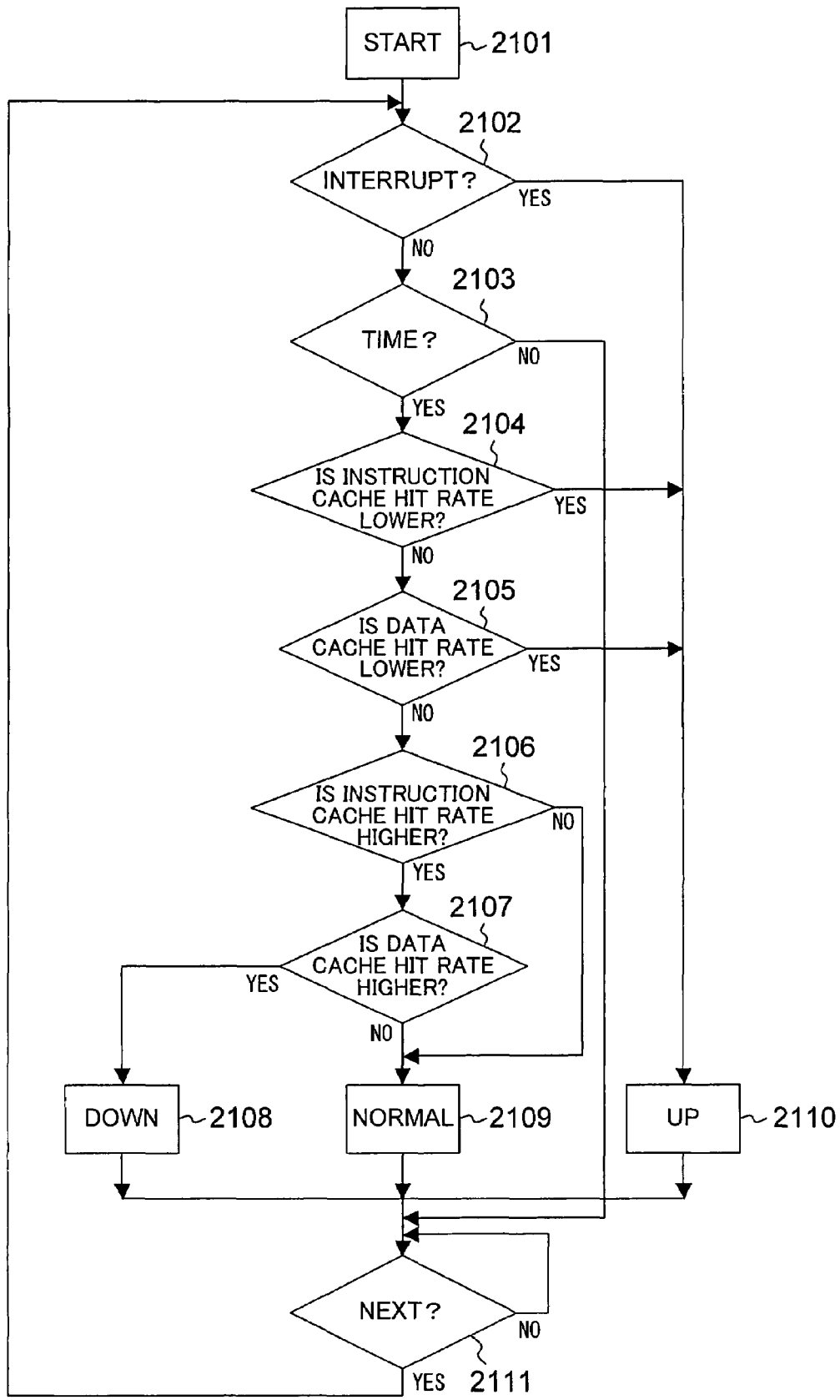
FIG. 7 is a flowchart showing the flow of process for generating an internal state signal in an internal state signal generation section according to a fourth embodiment of the present invention.

FIG. 7 is a flowchart showing the flow of process for generating the internal state signal 32 in the internal state signal generation section 207 shown in FIG. 2 according to a fourth embodiment of the present invention. The process for generating the internal state signal 32 performed in the internal state signal generation section 207 in this embodiment is different from that in the first embodiment. As in the first embodiment, the internal state signal 32 indicates one of the three states: the first state indicating that the priority of the access request of the requester 2 should be raised; the second state indicating that the normal priority should be maintained; and the third state indicating that the priority should be lowered.

The initial state is Step 2101, and after the system has been started, the process goes to Step 2102.

In Step 2102, a determination is made as to whether or not notification about occurrence of an interrupt has been made by the interrupt notification signal 260 shown in FIG. 2. If the notification has been made, the process goes to Step 2110, and if not, the process goes to Step 2103.

In Step 2103, a determination is made as to whether or not it is time to sample cache hit rates, notification of which is made by the cache hit rate information signals 250 and 251 shown in FIG. 2. If it is time to sample the cache hit rates, the process goes to Step 2104, and if not, the process goes to Step 2111. It should be noted that time intervals at which the sampling is performed do not have to be set fixed, but may be changeable by register settings or by programs.

In Step 2104, a determination is made as to whether or not the hit rate of the instruction cache, notification of which is made by the cache hit rate information signal 250, is lower than a value, which is lower than the previous sampled hit rate of the instruction cache by a third reference value predetermined for the instruction cache. If so, the process goes to Step 2110, and if not, the process goes to Step 2105.

In Step 2105, a determination is made as to whether or not the hit rate of the data cache, notification of which is made by the cache hit rate information signal 251, is lower than a value, which is lower than the previous sampled hit rate of the data cache by a third reference value predetermined for the data cache. If so, the process goes to Step 2110, and if not, the process goes to Step 2106.

It should be noted that the third reference values for the instruction cache and data cache do not need to be set fixed, but may be changeable by register settings or by programs. Also, the third reference values for the instruction cache and data cache do not have to be the same value.

In Step 2106, a determination is made as to whether or not the hit rate of the instruction cache, notification of which is made by the cache hit rate information signal 250, is higher than a value, which is higher than the previous sampled hit rate of the instruction cache by a fourth reference value predetermined for the instruction cache. If so, the process goes to Step 2107, and if not, the process goes to Step 2109. The fourth reference value for the instruction cache is higher than the third reference value for the instruction cache.

In Step 2107, a determination is made as to whether or not the hit rate of the data cache, notification of which is made by the cache hit rate information signal 251, is higher than a value, which is higher than the previous sampled hit rate of the data cache by a fourth reference value predetermined for the data cache. If so, the process goes to Step 2108, and if not, the process goes to Step 2109. The fourth reference value for the data cache is higher than the third reference value for the data cache.

It should be noted that the fourth reference values for the instruction cache and data cache do not need to be set fixed, but may be changeable by register settings or by programs. Also, the fourth reference values for the instruction cache and data cache do not have to be the same value.

In Step 2108, the internal state signal 32 is made to indicate the third state indicating that the priority should be lowered. After the completion of the processing, the process goes to Step 2111.

In Step 2109, the internal state signal 32 is made to indicate the second state indicating that the normal priority should be maintained. After the completion of the processing, the process goes to Step 2111.

In Step 2110, the internal state signal 32 is made to indicate the first state indicating that the priority should be raised. After the completion of the processing, the process goes to Step 2111.

In Step 2111, the process waits for the next cycle to start, and when the next cycle has started, the process goes to Step 2102.

Fifth Embodiment

Figure 8:
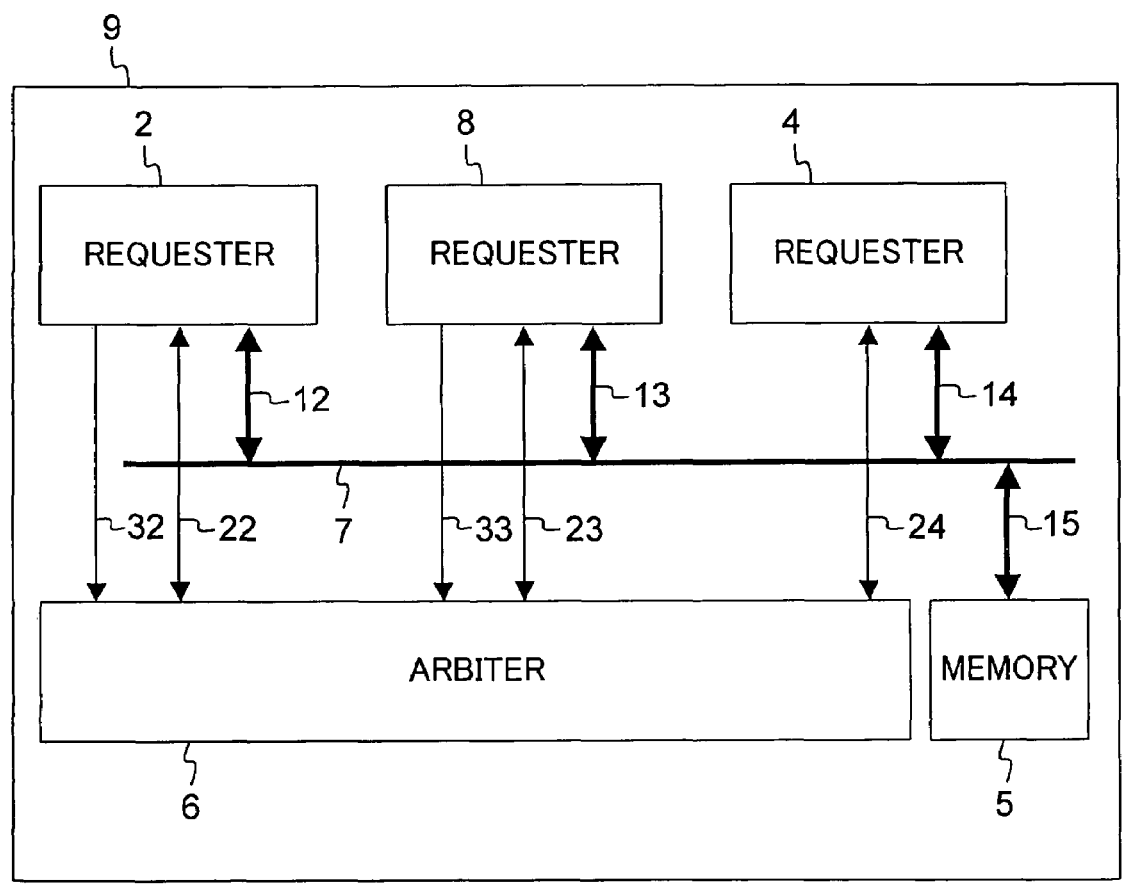
FIG. 8 is a block diagram illustrating the configuration of a bus system according to a fifth embodiment of the present invention.

FIG. 8 is a block diagram illustrating the configuration of a bus system 9 according to a fifth embodiment of the present invention. The bus system 9 shown in FIG. 8 is obtained by replacing the requester 3 with a requester 8 in the bus system 1 shown in FIG. 1.

The requester 8 has the same structure as the requester 2 and outputs an internal state signal 33 to an arbiter 6 so that the internal state in the requester 8 is reflected in arbitration. The internal state signal 33 indicates one of the three states: the first state indicating that the priority of the access request of the requester 8 should be raised; the second state indicating that the normal priority should be maintained; and the third state indicating that the priority should be lowered.

In this embodiment, it is assumed that the arbiter 6 has the following three priority orders, for example. In a priority order 1, the priorities of the requesters 2, 8, and 4 decrease in that order; in a priority order 2, the priorities of the requesters 4, 2, and 8 decrease in that order; and in a priority order 3, the priorities of the requesters 8, 4, and 2 decrease in that order.

Which priority order is used in which time period is determined in advance so that the number of data transmissions required by each requester can be satisfied in the system.

Figure 9:
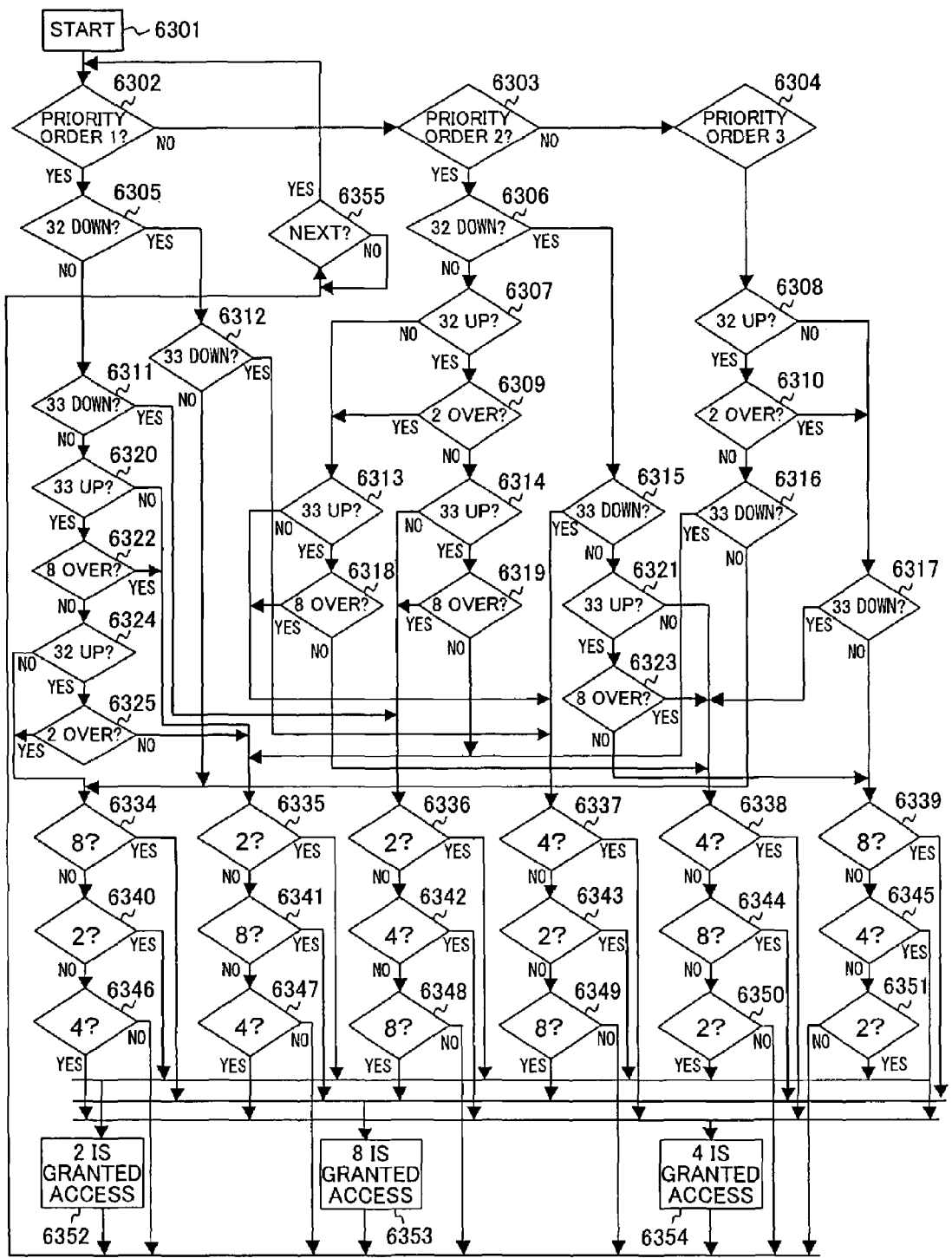
FIG. 9 is a flowchart showing the flow of arbitration process performed in an arbiter shown in FIG. 8.

FIG. 9 is a flowchart showing the flow of arbitration process performed in the arbiter 6 shown in FIG. 8 according to the fifth embodiment of the present invention.

The initial state is Step 6301, and after the system has been started, the process goes to Step 6302.

In Step 6302, it is determined whether or not the priority order used in the arbitration by the arbiter 6 of this embodiment is the priority order 1. If the priority order used in the arbitration is the priority order 1, the process goes to Step 6305, and if not, the process goes to Step 6303.

In Step 6303, it is determined whether or not the priority order used in the arbitration is the priority order 2. If the priority order used in the arbitration is the priority order 2, the process goes to Step 6306, and if not, the process goes to Step 6304.

In Step 6304, it is automatically determined that the priority order used in the arbitration is the priority order 3, and the process goes to Step 6308.

In Step 6305, it is determined whether the internal state signal 32 indicates the third state indicating that the priority should be lowered. If the internal state signal 32 indicates the third state, the process goes to Step 6312, and if not, the process goes to Step 6311.

In Step 6306, it is determined whether the internal state signal 32 indicates the third state indicating that the priority should be lowered. If the internal state signal 32 indicates the third state, the process goes to Step 6315, and if not, the process goes to Step 6307.

In Step 6307, it is determined whether the internal state signal 32 indicates the first state indicating that the priority should be raised. If the internal state signal 32 indicates the first state, the process goes to Step 6309, and if not, the process goes to Step 6313.

In Step 6308, it is determined whether the internal state signal 32 indicates the first state indicating that the priority should be raised. If the internal state signal 32 indicates the first state, the process goes to Step 6310, and if not, the process goes to Step 6317.

In Step 6309, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6313 without raising the priority of the requester 2 in this time period. If not, the process goes to Step 6314 so as to change the priority order used in the arbitration. It should be noted that this time period and the reference value do not have to be set fixed, but may be changeable by register settings or by programs.

Likewise, in Step 6310, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6317 without raising the priority of the requester 2 in this time period. If not, the process goes to Step 6316 so as to change the priority order used in the arbitration.

In Step 6311, it is determined whether the internal state signal 33 indicates the third state indicating that the priority should be lowered. If the internal state signal 33 indicates the third state, the process goes to Step 6336, and if not, the process goes to Step 6320.

In Step 6312, it is determined whether the internal state signal 33 indicates the third state indicating that the priority should be lowered. If the internal state signal 33 indicates the third state, the process goes to Step 6337, and if not, the process goes to Step 6334.

In Step 6313, it is determined whether the internal state signal 33 indicates the first state indicating that the priority should be raised. If the internal state signal 33 indicates the first state, the process goes to Step 6318, and if not, the process goes to Step 6337.

In Step 6314, it is determined whether the internal state signal 33 indicates the first state indicating that the priority should be raised. If the internal state signal 33 indicates the first state, the process goes to Step 6319, and if not, the process goes to Step 6336.

In Step 6315, it is determined whether the internal state signal 33 indicates the third state indicating that the priority should be lowered. If the internal state signal 33 indicates the third state, the process goes to Step 6337, and if not, the process goes to Step 6321.

In Step 6316, it is determined whether the internal state signal 33 indicates the third state indicating that the priority should be lowered. If the internal state signal 33 indicates the third state, the process goes to Step 6335, and if not, the process goes to Step 6334.

In Step 6317, it is determined whether the internal state signal 33 indicates the third state indicating that the priority should be lowered. If the internal state signal 33 indicates the third state, the process goes to Step 6338 so as to lower the priority of the requester 8, and if not, the process goes to Step 6339.

In Step 6318, a determination is made as to whether the number of accesses granted to the requester 8 has exceeded a predetermined reference value within a specified period of time, so as to prevent the accesses made by the requester 8 from hindering accesses required by the other requesters. If the number of accesses granted to the requester 8 has exceeded the predetermined reference value, the process goes to Step 6337 without raising the priority of the requester 8 in this time period. If not, the process goes to Step 6338 so as to raise the priorities of the requesters 2 and 8. It should be noted that this time period and the reference value do not have to be set fixed, but may be changeable by register settings or by programs. The time period and the reference value for the requester 8 may differ from those for the requester 2.

Likewise, in Step 6319, a determination is made as to whether the number of accesses granted to the requester 8 has exceeded a predetermined reference value within a specified period of time, so as to prevent the accesses made by the requester 8 from hindering accesses required by the other requesters. If the number of accesses granted to the requester 8 has exceeded the predetermined reference value, the process goes to Step 6336 without raising the priority of the requester 8 in this time period. If not, the process goes to Step 6335 so as to raise the priorities of the requesters 2 and 8.

In Step 6320, it is determined whether the internal state signal 33 indicates the first state indicating that the priority should be raised. If the internal state signal 33 indicates the first state, the process goes to Step 6322, and if not, the process goes to Step 6335.

In Step 6321, it is determined whether the internal state signal 33 indicates the first state indicating that the priority should be raised. If the internal state signal 33 indicates the first state, the process goes to Step 6323, and if not, the process goes to Step 6338.

In Step 6322, a determination is made as to whether the number of accesses granted to the requester 8 has exceeded a predetermined reference value within a specified period of time, so as to prevent the accesses made by the requester 8 from hindering accesses required by the other requesters. If the number of accesses granted to the requester 8 has exceeded the predetermined reference value, the process goes to Step 6335 without raising the priority of the requester 8 in this time period. If not, the process goes to Step 6324 so as to raise the priority of the requester 8.

In Step 6323, a determination is made as to whether the number of accesses granted to the requester 8 has exceeded a predetermined reference value within a specified period of time, so as to prevent the accesses made by the requester 8 from hindering accesses required by the other requesters. If the number of accesses granted to the requester 8 has exceeded the predetermined reference value, the process goes to Step 6338. If not, the process goes to Step 6339 so as to raise the priority of the requester 8.

In Step 6324, it is determined whether the internal state signal 32 indicates the first state indicating that the priority should be raised. If the internal state signal 32 indicates the first state, the process goes to Step 6325, and if not, the process goes to Step 6334.

In Step 6325, a determination is made as to whether the number of accesses granted to the requester 2 has exceeded a predetermined reference value within a specified period of time, so as to prevent the accesses made by the requester 2 from hindering accesses required by the other requesters. If the number of accesses granted to the requester 2 has exceeded the predetermined reference value, the process goes to Step 6334 without raising the priority of the requester 2 in this time period. If not, the process goes to Step 6335 so as to raise the priority of the requester 2.

In Step 6334, it is determined whether there is a request made from the requester 8 whose priority has been raised. If there is a request from the requester 8, the process goes to Step 6353, and if not, the process goes to Step 6340.

In Step 6335, it is determined whether there is a request made from the requester 2 that is the highest priority requester in the priority order 1. If there is a request from the requester 2, the process goes to Step 6352, and if not, the process goes to Step 6341.

In Step 6336, it is determined whether there is a request made from the requester 2 whose priority has been raised. If there is a request from the requester 2, the process goes to Step 6352, and if not, the process goes to Step 6342.

In Step 6337, it is determined whether there is a request made from the requester 4 that is the highest priority requester in the priority order 2. If there is a request from the requester 4, the process goes to Step 6354, and if not, the process goes to Step 6343.

In Step 6338, it is determined whether there is a request made from the requester 4 that is the highest priority requester in the priority order 2. If there is a request from the requester 4, the process goes to Step 6354, and if not, the process goes to Step 6344.

In Step 6339, it is determined whether there is a request made from the requester 8 that is the highest priority requester in the priority order 3. If there is a request from the requester 8, the process goes to Step 6353, and if not, the process goes to Step 6345.

In Step 6340, it is determined whether there is a request made from the requester 2 that is the highest priority requester in the priority order 1. If there is a request from the requester 2, the process goes to Step 6352, and if not, the process goes to Step 6346.

In Step 6341, it is determined whether there is a request made from the requester 8 that is the second-highest priority requester in the priority order 1. If there is a request from the requester 8, the process goes to Step 6353, and if not, the process goes to Step 6347.

In Step 6342, it is determined whether there is a request made from the requester 4 that is the highest priority requester in the priority order 2. If there is a request from the requester 4, the process goes to Step 6354, and if not, the process goes to Step 6348.

In Step 6343, it is determined whether there is a request made from the requester 2 that is the second-highest priority requester in the priority order 2. If there is a request from the requester 2, the process goes to Step 6352, and if not, the process goes to Step 6349.

In Step 6344, it is determined whether there is a request made from the requester 8 that is the highest priority requester in the priority order 3. If there is a request from the requester 8, the process goes to Step 6353, and if not, the process goes to Step 6350.

In Step 6345, it is determined whether there is a request made from the requester 4 that is the second-highest priority requester in the priority order 3. If there is a request from the requester 4, the process goes to Step 6354, and if not, the process goes to Step 6351.

In Step 6346, it is determined whether there is a request made from the requester 4 that is the third-highest priority requester in the priority order 1. If there is a request from the requester 4, the process goes to Step 6354, and if not, the process goes to Step 6355.

In Step 6347, it is determined whether there is a request made from the requester 4 that is the third-highest priority requester in the priority order 1. If there is a request from the requester 4, the process goes to Step 6354, and if not, the process goes to Step 6355.

In Step 6348, it is determined whether there is a request made from the requester 8 that is the third-highest priority requester in the priority order 2. If there is a request from the requester 8, the process goes to Step 6353, and if not, the process goes to Step 6355.

In Step 6349, it is determined whether there is a request made from the requester 8 that is the third-highest priority requester in the priority order 2. If there is a request from the requester 8, the process goes to Step 6353, and if not, the process goes to Step 6355.

In Step 6350, it is determined whether there is a request made from the requester 2 that is the third-highest priority requester in the priority order 3. If there is a request from the requester 2, the process goes to Step 6352, and if not, the process goes to Step 6355.

In Step 6351, it is determined whether there is a request made from the requester 2 that is the third-highest priority requester in the priority order 3. If there is a request from the requester 2, the process goes to Step 6352, and if not, the process goes to Step 6355.

In Step 6352, the request from the requester 2 is permitted such that the requester 2 accesses the memory 5. After the completion of the access, the process goes to Step 6355.

In Step 6353, the request from the requester 8 is permitted such that the requester 8 accesses the memory 5. After the completion of the access, the process goes to Step 6355.

In Step 6354, the request from the requester 4 is permitted such that the requester 4 accesses the memory 5. After the completion of the access, the process goes to Step 6355.

In Step 6355, the process waits until the next access can be permitted, and when it becomes possible to permit the access, the process goes to Step 6302.

In this embodiment, a case in which three requesters are provided has been described by way of example. However, the number of requesters, and specific priorities in arbitration do not have to be the same as those described in the example.

As described above, the present invention, which allows the internal state of a requester, such as a CPU, to be reflected in access request arbitration to thereby reduce access latency occurring in that requester, is applicable to various kinds of systems, in which a plurality of requesters access a shared resource, including systems for performing multimedia processing.

What is claimed is:

1. A bus system comprising:
   a shared resource;
   a shared bus;
   a plurality of requesters; and
   a bus arbiter for arbitrating access requests made by the plurality of requesters to access the shared resource through the shared bus,
   wherein at least one of the plurality of requesters has a cache memory and outputs, according to a cache hit rate of the cache memory, an internal state signal indicating that the priority of an access request made by that requester needs to be changed,
   the bus arbiter arbitrates the access requests in accordance with the internal state signal, and
   if a second cache hit rate, measured after an already measured first cache hit rate, is lower than a first value, which is lower than the first cache hit rate by a predetermined value, the requester having the cache memory makes the internal state signal indicate that the priority needs to be raised.

2. The bus system of claim 1, wherein if the second cache hit rate is higher than a second value, which is higher than the first cache hit rate by a predetermined value, the requester having the cache memory makes the internal state signal indicate that the priority needs to be lowered.

3. A bus system comprising:
a shared resource;
a shared bus;
a plurality of requesters; and
a bus arbiter for arbitrating access requests made by the plurality of requesters to access the shared resource through the shared bus,
wherein at least one of the plurality of requesters outputs, according to an internal state in that requester, an internal state signal indicating that the priority of an access request made by that requester needs to be changed,
the bus arbiter arbitrates the access requests in accordance with the internal state signal, and
at least one of the at least one requester that outputs the internal state signal has an interrupt control section for controlling an interrupt occurring in that requester and generates the internal state signal of that requester in accordance with notification of occurrence of an interrupt from the interrupt control section.

4. The bus system of claim 3, wherein the requester having the interrupt control section makes the internal state signal indicate that the priority needs to be raised during a predetermined amount of time after the occurrence of the interrupt, and indicate that the priority needs to be maintained after the predetermined amount of time has elapsed.

* * * * *